(12) United States Patent
Chan et al.

(10) Patent No.: US 10,114,440 B2
(45) Date of Patent: Oct. 30, 2018

(54) APPLYING POWER MANAGEMENT BASED ON A TARGET TIME

(71) Applicant: Razer (Asia-Pacific) Pte. Ltd., Singapore (SG)

(72) Inventors: Michael A. Chan, San Francisco, CA (US); William Duncan McVicker, Pleasant Hill, CA (US); Tom Moss, Los Altos, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 25 days.

(21) Appl. No.: 15/296,091

(22) Filed: Oct. 18, 2016

(65) Prior Publication Data

US 2017/0371394 A1 Dec. 28, 2017

Related U.S. Application Data

(60) Provisional application No. 62/353,310, filed on Jun. 22, 2016.

(51) Int. Cl.
*G06F 1/32* (2006.01)
(52) U.S. Cl.
CPC .......... *G06F 1/3212* (2013.01); *G06F 1/3218* (2013.01); *G06F 1/3265* (2013.01)

(58) Field of Classification Search
CPC ............ H04W 52/0261; H04W 52/027; G06F 1/3212
See application file for complete search history.

(56) References Cited

U.S. PATENT DOCUMENTS

| | | | |
|---|---|---|---|
| 2008/0165714 A1* | 7/2008 | Dettinger | H04W 52/0261 370/311 |
| 2015/0156307 A1* | 6/2015 | Kim | H04W 52/0261 455/566 |
| 2015/0181531 A1* | 6/2015 | Zajac | G06F 1/3212 455/574 |

* cited by examiner

*Primary Examiner* — Albert Wang
(74) *Attorney, Agent, or Firm* — Mattingly & Malur, PC

(57) ABSTRACT

In some examples, an electronic device may determine a target time to which the remaining battery charge is to last, such as based on a user input or historical usage of the electronic device. Additionally, the electronic device may determine a current amount of the battery charge remaining, and may determine user activities likely to occur between the present time and the target time. Based at least partially on the amount of the battery charge remaining and the user activities determined to be likely to occur before the target time, the electronic device may apply one or more power management restrictions to one or more resources of the electronic device.

20 Claims, 7 Drawing Sheets

| Time | App or Feature | Duration | Start Battery Level | End Battery Level | Geolocation | Power Mgmt Mode | Power Mgmt Profile |
|---|---|---|---|---|---|---|---|
| ... | ... | ... | ... | ... | ... | ... | ... |
| 2016-06-05 12:07:05 | Social Media App1 | 00:15:11 | 77% | 75% | 38.8968, -77.0365 | Stage 1 | App1 Specific Profile |
| 2016-06-05 12:22:16 | Phone to 409-555-1234 | 00:01:46 | 75% | 74% | 38.8968, -77.0365 | Stage 1 | Phone Default Profile |
| ... | ... | ... | ... | ... | ... | ... | ... |

FIG. 4

APPLYING POWER MANAGEMENT BASED ON A TARGET TIME

CROSS-REFERENCE TO RELATED APPLICATION

This application claims the benefit of U.S. Provisional Patent Application No. 62/353,310, to Michael A. Chan et al, filed Jun. 22, 2016, which is incorporated herein by reference in its entirety.

BACKGROUND

People use electronic devices for communication, socializing, entertainment, work, navigation, web browsing, and a variety of other functions. However, an electronic device typically has a limited amount of energy charged in the battery, thus restricting how often and for how long a user may use the electronic device. For example, people may use their electronic devices throughout the day, and then may have to turn off or otherwise limit the use of their devices toward the end of the day when they notice that their battery charges are close to being depleted. Additionally, some people may carry chargers and may attempt to find open electrical outlets to charge their electronic devices when their battery charges are running low. Furthermore, different people often use their electronic devices in very different ways from other people such that conventional power management configurations may not be useful for some individuals.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example usage log data structure according to some implementations.

DETAILED DESCRIPTION

Figure 1:
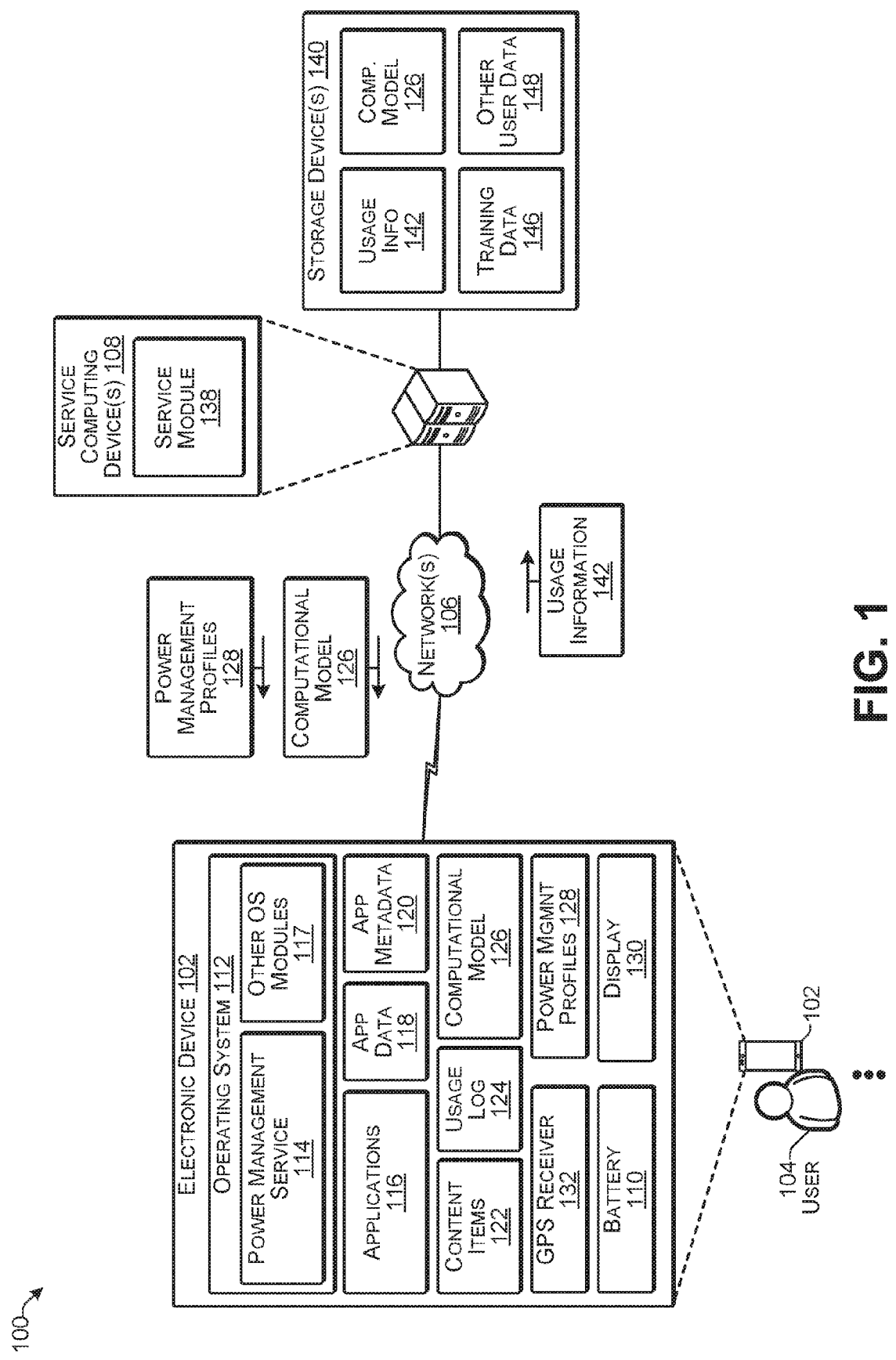
FIG. 1 illustrates an example system for power management on an electronic device according to some implementations.

Some examples herein are directed to power management on an electronic device. For example, a power management service on the electronic device may monitor usage of the electronic device by the user of the electronic device and may implement one or more power management techniques automatically based on the remaining battery charge and predicted usage. In some cases, the power management settings may be dynamically adjusted in view of the predicted usage of the electronic device for extending the time until the battery charge is depleted to meet or exceed a target time. As one example, the electronic device may determine the predicted usage of the electronic device based on past usage for the same day of the week, time of day, determined current location, etc., and may perform power management to manage the remaining battery charge to enable use of the electronic device for the activities predicted to be performed up through the target time.

In some examples, the power management may be incremented based on a plurality of different power management stages. As an example, there may be a stage with no power management, and three power management stages, e.g., a first power management stage that minimally impacts the user experience, a second power management stage that has a noticeable impact on the user experience, and a third power management stage that significantly impacts the user experience. Of course, more or fewer power management stages may be applied. For instance, each power management stage may be progressively more aggressive in limiting the features of the electronic device for increasing the power saved. In some cases, there may be a hierarchy of power management features such that the successive stages progress further through the hierarchy to more restrictive use of power. Additionally, the user may selectively or entirely override some or all of the power management features, as desired. In the case that the user overrides power management features, the device may warn the user that the battery may be depleted before the target time is reached.

Further, in some examples, the user may manually set the target time until which the user would like the battery to last. In response, the electronic device may dynamically select an appropriate power management stage to enforce based on predicted user activity that is likely to occur up through the target time. The electronic device may determine the current predicted battery charge level and may predict the future usage of the electronic device until the target time. For instance, the electronic device may determine the current usage (e.g., activities currently being performed), recent usage (e.g., activities already performed today), historical usage, current day, current time, current location, and so forth. Based on this, the electronic device may predict how the battery charge will be depleted up until the target time and, if necessary to ensure that the battery charge lasts until the target time, may select a power management stage based on the predicted use of the electronic device until the target time.

As the target time approaches, the electronic device may change the selected power management stage, such as moving up or down a stage, to ensure that the remaining battery charge is sufficient for the predicted activities that may occur until the target time is reached, but also to ensure that the power management settings are not unnecessarily restrictive. Further, in some cases, rather than having the user manually set the target time, the electronic device may predict the target time to which the user may desire the battery charge to last, such as based on past usage patterns, and may perform the above-described functions in the same manner as if the user had manually selected the target time.

As mentioned above, the electronic device may determine when to implement particular stages and/or may determine which of the power management techniques to include in each stage based on past usage of the electronic device, such as for the same time of day and day of the week. Accordingly, the electronic device may predict one or more activities that the user is likely to perform later, such as that the user is likely to use a particular application to obtain a ride home, make a phone call at a particular time, respond to emails around a certain time, check a social media application a predicted number of times, read a news feed, and so forth. In addition, the electronic device may use other information when predicting upcoming user activity, such as by referring to the user's calendar to determine any scheduled events. The electronic device may meter or otherwise control the use of the remaining battery power based on the predicted activities between a current time and the target time. Furthermore, if the user performs an activity that is unexpected or does not perform an activity that is expected, the electronic device may dynamically adapt the power management settings based on this.

In some examples, machine learning may be used to determine and/or apply the power management stages. The machine learning may further be applied to determine and apply one or more power management profiles that are customized for the user of the electronic device and for applications and/or categories of applications on the electronic device. For example, a neural network, statistical model, or other computational model may be used to determine and apply appropriate power management for particular situations. As one example, the electronic device may maintain a usage log that includes usage information about the applications and other features of the electronic device used by the user. For instance, the usage log may include the name of the application or feature used, the time of day of the usage, the length of the usage, the day of the week of the usage, the geographic location at which the usage occurred, and so forth.

The usage log information may be used as training data for the computational model. As one example, the usage log information may be sent over a network to a service computing device, which may train a neural network, statistical model, or other type of computational model, and may provide the trained computational model to the electronic device for use in determining appropriate power management settings for a particular time of day, day of the week, determined device location, and so forth. Alternatively, the electronic device itself may train and generate the computational model, such as at night while the electronic device is charging, or the like.

In some implementations, as part of implementing the power management stages discussed above, one or more profiles may be used for implementing different power-saving techniques for different applications on the electronic device. As an example, a plurality of generic or otherwise default profiles may be established for different categories of applications. For instance, a first default profile may be implemented for gaming applications, a second default profile may be implemented for social media and messaging applications, a third default profile may be implemented for navigation and mapping applications, a fourth default profile may be implemented for media playback applications, a fifth default profile may be implemented for web browsing applications, and so forth. Each default profile may be further customized for individual applications, such as based on information determined about the individual application from observed usage, user inputs, and/or from metadata associated with the application.

The profiles may enable the power management to be incremented in a hierarchical manner based on the usage of the electronic device, the remaining battery charge amount, and the predicted usage through to a target time, while also allowing use of applications and other functions of the electronic device. For instance, when applying power management, the electronic device may reduce the screen refresh rate and the number of frames per second (FPS) rendered for particular applications and/or graphic user interfaces (GUIs) to effect a reduction in power consumption. To progressively increase power savings, such as when advancing power management from the first stage to the second stage or third stage, the FPS may be progressively reduced for some applications and GUIs. Further, the electronic device may perform a number of additional power saving techniques, such as reducing the display refresh rate; throttling the CPU(s), GPU(s), or other processors, limiting turbo mode or otherwise limiting the clock speed on some processing cores, reducing display brightness, reducing frequency of certain operations or processes, reducing network communication, turning off certain features, and so forth.

As one example, a default profile for applications classified in a gaming category may reduce the frame generation rate in software, such as by reducing the number of frames rendered from 60 frames per second (FPS) to e.g., 45, 40, 30 FPS, and so forth, depending on the type of game. In addition, the display hardware may also be controlled, such as to reduce the display refresh rate to be equal to or greater than the frame generation rate, and/or to reduce the display brightness. Other power reduction actions for gaming category applications may include throttling one or more processors or processor cores, reducing the frequency of network communications, and the like.

As another example, a default power management profile for applications in a mapping or other navigation category may reduce the frequency of the usage of the GPS (Global Positioning System) receiver, may reduce the frames per second rendered, may reduce the display refresh rate, may reduce display brightness, may reduce the frequency of communication with a server over a network, and so forth. Accordingly, each respective default power management profile may be configured for a respective application category such that power savings may be achieved initially without substantially affecting the user experience (e.g., power management stage one).

The power management profiles may be further configured to advance the power management from stage one to stage two and/or stage three by more aggressively restricting certain features or employing other power saving techniques. For instance, as the first stage of power management, a default power management profile for the gaming category may initially reduce the FPS rendered from 60 to 45 FPS and may reduce the display refresh rate from 60 Hz to 45 Hz. Subsequently, as the second stage of power management, the default gaming profile may reduce the display refresh rate to 45 Hz, may implement processor throttling, e.g., as discussed additionally below, and may reduce network communications. Further, during the third stage of power management, if the user desires to continue playing a game, the default gaming profile may reduce display brightness, may reduce the frames rendered from 45 to 30 FPS, may reduce the display refresh rate to 30 Hz, may further throttle the processors, may eliminate network communications, and so forth.

Further, in some examples, a service provider may provide optimized power management profiles that are optimized for popular applications for particular models of electronic devices. In some cases, the service provider may update these optimized power management profiles as the applications themselves are updated. Additionally, the user may be able to adjust the settings for a particular profile, and may be able to save the settings as a custom profile either for a particular application or for a particular application category.

In some examples, the power management service may be an application, program, or other executable module that is part of the OS. In other examples, the power management service may be an application, program, or other executable module that is separate from the OS. In either event, the power management service may include or may resemble an application that the user may be able to see and access via a graphic user interface (GUI), such as for adjusting settings of the power management service in general, adjusting settings of particular power management profiles, setting target times, and so forth. Alternatively, in other examples, the power management service may be implemented as a module of the OS that is not accessible to the user. As still another alternative, the power management service may be an application separate from the OS that the user cannot see.

In some examples, the power management service on the electronic device may use one or more APIs to communicate over a network with a service computing device executing a service module. For instance, the service module may include one or more programs or other executable code configured to train a computational model based on gathered usage information about the user. The electronic device may use the API(s) to send, to the service computing device, the usage information including usage log data about how and where the user uses the electronic device, which applications and features the user uses, when the user uses the applications and features, and so forth. Based on the received usage information, the service computing device may train a computational model and may send the computational model to the electronic device to be used for predicting future usage of the electronic device, predicting a target time to which the user would like battery to last, determining when to implement power management, which power management stages and/or application profiles to implement, and so forth.

For discussion purposes, some example implementations of a power management service are described in the environment of a mobile electronic device for conserving a battery charge on the electronic device with minimal disruption to the user experience. However, implementations herein are not limited to the particular examples provided, and may be extended to other types of devices, other execution environments, other system architectures, other power conservation techniques, and so forth, as will be apparent to those of skill in the art in light of the disclosure herein.

FIG. 1 illustrates an example system 100 for enabling power management according to some implementations. For instance, the system 100 may enable an electronic device 102 associated with a user 104 to communicate over one or more networks 106 with one or more service computing devices 108 of a service provider. The electronic device 102 may be a type of portable or otherwise mobile computing device that uses a battery 110. Some examples of the electronic device 102 may include cellular phones, smart phones, tablet computing devices, wearable computing devices, body-mounted computing devices, and other types of mobile devices; laptops, netbooks, and other mobile computers or semi-mobile computers; augmented reality devices, gaming systems, or any of various other computing devices capable of storing data, sending communications, and performing the functions according to the techniques described herein. Further, while a single user 104 and associated electronic device 102 are illustrated in this example, in other examples, there may be a large number of users 104, each having one or more respective electronic devices 102.

The electronic device 102 may include an operating system 112 that includes a power management service 114 that executes on the electronic device 102. The power management service 114 may include executable code or other executable instructions that provide power management functionality to the electronic device 102 for controlling features and resources of the electronic device 102 for effecting power management. In some examples, the power management service 114 may be one or more modules of the operating system (OS) 112 on the electronic device 102. In other examples, the power management service 114 may be one or more modules that are separate from the OS 112, such as may be included in a separate application, which may be one of a plurality of applications 116 executable on the electronic device 102. Further, whether as an OS module or as a separate application, the power management service 114 may have permission for system-level access to the applications 116 that are executable on the electronic device 102, as well as to various drivers, such as a display driver, a GPU driver, and other OS modules 117. In addition, while the power management service 114 is illustrated in this example as residing on the electronic device 102, in other examples, at least some of the functionality of the power management service 114 may reside on another suitable computing device. In addition, as mentioned above, the OS 112 may include a number of other OS modules 117, such as drivers and other executable modules for controlling various functions and aspects of the electronic device 102.

The electronic device 102 may further include, for the applications 116, associated application data 118, and application metadata 120. The applications (apps) 116 may be installed and executable on the electronic device 102. The application data 118 may include user application data that is associated with, generated by, and/or used by respective applications 116. For instance, each application 116 may have an associated portion of application data 118, respectively. In addition, the application metadata 120 may include information about the applications 116, such as the name of the application, a source of the application, an application category, a storage size, and so forth. In addition, the electronic device 102 may store one or more content items 122. Examples of content items 122 may include digital photographs or other images, videos, audio recordings, documents, books, movies, television shows, and the like.

In addition, the electronic device 102 may maintain a usage log 124, which may include a record of each time the user 104 uses the electronic device 102, such as causing execution of an application 116 on the electronic device. Furthermore, the usage log 124 may include a record of each time the user accesses the electronic device 102, such as to check messages or notifications, make a telephone call, send a message, use the camera, interact with the operating system, or perform other user activities which may be referred to herein as using one or more features of the electronic device 102. Accordingly, the usage log 124 may include a record of each time the user uses an application or other feature of the electronic device 102, including the day and time on which the application or feature was used, the length of time for which the application or feature was used, the geographic location of the electronic device when the application or feature was used, and possibly other information such as a starting battery level and a finishing battery level during use of the application or feature, locations of the device before and/or after the application or feature was used, or the like.

In some cases, the electronic device 102 may include a computational model 126 that may include settings or other information for the multiple power management stages discussed above, and the electronic device 102 may also include a plurality of power management profiles 128 that may be applied based on corresponding application or features selected by the user. A display 130 may be associated with the electronic device 102 for presenting various types of visual information to the user 104, such graphic user interfaces (GUIs) presented by the operating system or the applications 116, as well as other UIs, content items, text, images, or other digital information.

Additionally, in this example, the electronic device includes a GPS receiver 132 that may be used for determining at least partially a geographic location of the electronic device 102. Further, while several executable programs or modules, hardware components, and data of the electronic device 102 are described and illustrated in this example, numerous other types of programs, system data, user data, user settings, user account information, hardware components, and so forth, may be included in the electronic device 102, as discussed additionally herein and/or as will be apparent to those of skill in the art having the benefit of the disclosure herein.

In the illustrated example, the one or more service computing devices 108 may include a service module 138 that is executable to send and receive communications with the electronic device 102. Further, the service computing device 108 may include, or may be in communication with, one or more storage devices 140, such as by direct connection or via the one or more networks 106. In the case that the service computing device 108 provides a commercial storage service, the storage devices 140 may be enterprise level storage arrays, such as may be maintained in a storage area network, a NAS cluster, a RAID (redundant array of independent disks) array, a distributed storage node array, or various other types of storage configurations.

The one or more networks 106 may include any suitable network, including a wide area network, such as the Internet; a local area network, such as an intranet; a wireless network, such as a cellular network; a local wireless network, such as Wi-Fi; short-range wireless communications, such as BLUETOOTH®; a wired network, such as fiber or Ethernet; or any other suitable network, or any combination thereof. Accordingly, the one or more networks 106 may include both wired and/or wireless communication technologies. Components used for such communication technologies can depend at least in part upon the type of network and/or the environment selected. Protocols for communicating over such networks are well known and will not be discussed herein in detail. Accordingly, the electronic device 102 and the service computing device 108 are able to communicate over the one or more networks 106 using wired or wireless connections, and combinations thereof.

The service module 138 on the service computing device 108 may receive the usage information 142 from the power management service 114, such as via one or more APIs, or the like. For example, the power management service 114 may send usage information 142 including information obtained from the usage log 124 to the service computing device 108 to enable the service computing device 108 to train the computational model 126. Accordingly, the service module 138 may incorporate the usage information 142 into training data 146. The training data 146 may include the usage information 142 about the user 104, and in some examples, may include aggregated usage information from other users having the same or similar electronic devices 102.

Further, the service module 138 may train a different computational model 126 for each separate user 104 and/or each separate electronic device 102 of a plurality of users 104 associated with a plurality of respective electronic devices 102. For instance, each computational model 126 may be trained for a particular user 104 and a particular electronic device 102 based at least partially on the respective usage information 142 received from that particular electronic device 102.

In some implementations, the power management service 114 may dynamically manage the amount of the battery charge remaining on the electronic device 102. In some cases, the power management service 114 may use the computational model 126 for determining when to implement power management, while in other cases, the power management service 114 may determine usage patterns directly from the usage log 124, without use of the computational model 126.

In the case that that usage patterns are determined directly from the usage log 124, the power management service 114 may observe application usage and other device feature usage by the user 104 to determine usage patterns for the user 104 with respect to particular applications 116 and other device features, and may store this information in the usage log 124. For instance, the power management service 114 may determine that the user typically begins charging the electronic device 102 at night between 11:00 PM and 11:30 PM on weekdays and between midnight and 1:30 AM on Fridays and Saturdays. Based on this, the power management service 114 may establish a target time for the battery charge to last to be 11:30 PM on weekdays and 1:30 AM on Fridays and Saturdays. Furthermore, based on the observed usage of applications 116 and other device features on individual days of the week, the power management service 114 may establish patterns of use of applications and device features for each day of the week, and may use this information when determining whether power management is necessary for individual days of the week, and for predicting what applications and features will be used by the user 104 on each day of the week.

Thus, the power management service 114 may determine usage patterns directly from the usage log 124 for determining when to implement power management on the electronic device 124. The power management service 114 may determine which applications 116 are likely to be used by the user 104 in the near future, i.e., before the next time the user charges the battery 110 on the electronic device 102. The power management service 114 may employ one or more observed user usage patterns and expressed user preferences when determining device resources and features to limit for obtaining power savings.

Additionally, or alternatively, the power management service 114 may use the computational model 126 for determining power management. For example, the power management service 114 may apply one or more inputs of current information to the computational model, such as a current time of day, day of the week, battery level, usage log information already recorded this day, current geolocation, and the like, when determining which power management stage to implement, when to implement a particular power management stage, and which power management profiles to apply and/or features and resources to restrict on the electronic device 102. For instance, the computational model 126 may be used to make determinations and other types of predictions based on inputted data. As one example, the computational model 126 may be a neural network or statistical model that includes a set of assumptions concerning data based in part on information about similar data determined from a larger population of data. For instance, the computational model may be configured with one or more mathematical equations that relate one or more random variables and, in some cases, non-random variables. Typically, prior to being used to make predictions, the computational model may be trained using a quantity of training data 146, which in this example may include at least usage information 142 from the usage log 124 of the user 104, and in some examples, may also include usage information from other users, such as other users determined to have a similarity to the current user in one or more demographic aspects.

Examples of suitable computational models 126 that may be used in some implementations herein may include predictive models, decision trees, classifiers, regression models, such as linear regression models, support vector machines, and stochastic models, such as Markov models and hidden Markov models, artificial neural networks, such as recurrent neural networks, and so forth. Accordingly, after the computational model 126 is been trained, the computational model 126 may be used by the power management service 114 to provide predictions of user activities and determinations of power management stages to apply based on the current day, current time, current location, current remaining battery charge, and/or activities already performed by the user during the current day.

As mentioned above, in some cases the computational model 126 may be trained by the service computing device 108 and provided to the electronic device 102, while in other cases, the electronic device 102 may train the computational model 126. In the case that the service computing device 108 trains the computational model, the service module 138 may receive the usage information 142 and may store the usage information 142 in association with a user account associated with the user 104 and/or the electronic device 102. As one example, the user's usage information 142, computational model 126, training data 146, and other user data 148, such as backup data or the like, may be stored at the network storage devices 140 in association with a cloud storage account of the user 104 of the electronic device 102. The service module 138 may train the computational model 126 and may send the computational model 126 to the electronic device 102 for use by the power management service 114 for determining when and how to apply power management.

Whether used for generating the computational model 126, or when used without the computational model 126, the usage log 124 typically may provide a high level of confidence of a time at which the user 104 will charge the electronic device 102. Further, the electronic device 102 may determine a current location and the location at which charging typically occurs, such as may be determined using the GPS receiver 132. For example, supposed that on Tuesday nights, the user typically begins charging the electronic device between 11:00 PM and 11:30 PM. Further, suppose that the current time is 10:00 PM and user is at a location 10 miles from home, and that the user 104 typically uses a ride sharing application around 10:30 PM when at the current location. Based on this information, the electronic device 102 may predict that the user 104 is likely to use the ride sharing application tonight, and my implement a power saving stage that is likely to ensure that there is enough battery left at 10:30 PM to enable the user to use the ride sharing application and also perform any other activities that the user typically performs between 10:00 PM and 11:30 PM, or that the user otherwise typically performs but has not yet performed tonight.

Alternatively, if the user is in a location that is not the usual location, e.g., 30 miles from home, the power management service 114 may change the target time from 11:30 PM to a later time, may go to a higher power management stage than usual, such as switching from stage 1 to stage 2, or the like. Thus, the power management service 114 may correlate the current location information and current usage information with the historical location information and historical usage information from the usage log 124 to attempt to predict future usage of the electronic device between a current time and the target time.

As another example, suppose that in one or more of the power management stages, the electronic device 102 is configured to go into a sleep mode after a certain amount of time in standby mode, such as 20 minutes. Further, suppose that, based on the user's calendar, the power management service 114 determines that the user is scheduled to attend a meeting during the next hour. Accordingly, rather than waiting for the predetermined amount of time in standby mode, the power management service 114 may cause the electronic device 102 to automatically enter the sleep mode as soon as the meeting starts, or shortly thereafter, instead of waiting for 20 minutes.

As mentioned above, the power management service 114 may apply power management settings according to several power management stages, such as three power management stages in some examples herein. Furthermore, the power management service 114 may provide a popup window or other notification to the user as each stage is entered. As several non-limiting examples, stage 1 may be configured to have minimal impact on the user experience, such as by throttling the CPU clock speed, reducing the frame rate/display refresh rate for some apps, and so forth. Stage 2 may begin to have a noticeable impact on the user experience and may produce noticeable degraded performance for some applications. Thus stage may include the stage 1 restrictions, plus heavier CPU throttling, may include preventing core turbo modes from engaging, may include dimming the display, reducing the frame rate and refresh rate more for some applications, reducing background network activity and notifications, and so forth. Stage 3 may heavily impact the user experience, and may include stage 2 restrictions, plus turning off background network activity and notifications, turning off vibrations, turning off animations in GUIs, turning off the display for certain uses, going into a sleep mode, or the like.

Additionally, in some examples, the different stages may be applied on a per application basis and per feature basis, rather than being applied uniformly across all activity on the electronic device 102. Thus, the power management profiles 128 may be preconfigured for particular applications and features on the electronic device 102 so that the impact on usability of the applications and features due to the power management is minimized For instance, the power management service 114 may determine a power management profile 128 associated with each application 116, and may determine which power management restrictions to apply to each application based at least partially on the associated profile 128.

As one example, suppose that the user 104 frequently plays games on the electronic device 102, and is willing to sacrifice some game performance to be able to play the games twice as long without fully depleting the battery 110. Thus, the power management service 114 may determine the appropriate restrictions to apply during power management stages 1, 2, and 3, for the power management profile 128 for one or more particular game applications, such as based on a selected power management profile 128 for the particular application, past user usage patterns, past manually input user settings for the particular application, or the like.

Alternatively, suppose that the user does not want to have the performance throttled when playing games, but is willing to sacrifice performance of other applications and features of the electronic device 102. Accordingly, the user may instruct the power management service 114 to not apply any power saving techniques to game applications, but instead, apply more stringent power management techniques to other applications and features on the electronic device 102. Thus, the game application may be used as long as possible without restrictions, while other applications and features may operate under power management stage 3. Subsequently, if the power management service 114 determines that the battery charge is predicted to be depleted before the target time, the power management service 114 may notify the user of this situation, and the user may decide whether to enter a power management stage for the game application, e.g., stage 2, stop playing the game application altogether, or continue playing and have the battery charge run out before the target time.

As mentioned above, when performing power management, in some examples herein, the frame rendering rate may be reduced for some applications. For instance, the frame rate, i.e., the rendered frames per second for an application, may be reduced for many applications 116 without significantly affecting the user experience. The application 116 itself may be controlled in software to limit the number of frames rendered per second, such as by controlling a GPU driver to limit the number of frames that are rendered per second to a desired FPS, e.g., 45, 40, 30 FPS etc., depending on the category of application and/or the particular attributes of the particular application. For instance, the GPU driver may be throttled by controlling the FPS rendered for a particular application being executed based on a predetermined setting for achieving a desired power savings while maintaining usability of the application.

The FPS for individual applications may be determined based on a category of the individual application and/or based a profile determined for the individual application in advance, or a combination thereof. As an example, the FPS for a social network application may be substantially lower than the FPS for a first-person-shooter game. In some cases, a large number of popular applications may have respective power management profiles 128 generated in advance of execution of the respective applications and stored on the electronic device 102. If an application 116 that is currently being executed on the electronic device 102 does not have a corresponding application-specific power management profile 128, then a default power saving profile may be applied to the application based on a category within which the particular program is classified. As one example, the application metadata 120 may indicate the application category for each application.

In addition, the refresh rate of the display 130 may be controlled for limiting the number of times per second the display is refreshed. For instance, if the display 130 normally refreshes 60 times per second (i.e., 60 Hz), the refresh rate may be reduced to reduce that number of times per second that the display 130 is redrawn. In some examples, the refresh rate may be reduced to match the frame rendering rate of the application. For example, if the frame rendering rate of the application is limited to rendering 45 FPS, the refresh rate of the display may be limited to a display refresh rate of, e.g., 45 Hz, or in some cases a refresh rate greater than 45 Hz or less than 45 Hz. If the display refresh rate is limited to less than 45 Hz, however, then the FPS rendered may also be reduced to equal the display refresh rate so that energy is not wasted rendering frames that may not be displayed. The kernel of the operating system 112 may include a setting for controlling the refresh rate of the display, such as for changing a display driver setting for the display based on a detected application being executed for presentation on the display. As one example, the kernel may control a clock setting that controls the refresh rate of the display, and the clock setting may be adjusted by the power management service 114 to control the refresh rate of the display.

Further, in some examples, during enforcement of the power management stages 1-3, such as by applying one or more of the power management profiles 128, the relative loads on the GPU and CPU may be monitored, and adjusted. For example, if an application is primarily using the GPU, the clock speed on the CPU may be reduced while that application is being used. For example, when throttling the CPU a voltage range may be limited to limit the frequency at which the CPU is able to operate. Further, a turbo mode (high frequency clock speeds) on some cores may be disabled, so that the maximum frequency of these cores is limited to a set maximum frequency. As one example, suppose that in turbo mode, a processor core may be able to operate at 1.44 GHz, but if the turbo mode is disabled, the core may only be able to operate at 787 MHz. As a result, when the load on this core is causing the core to operate at a maximum frequency (e.g., 787 MHz), some of this load may be automatically transferred to other cores, which may have unused capacity, thus balancing the load among the cores while saving power due to the lower clock speeds being enforced on the cores. For example, many applications and other tasks do not require high-frequency processing.

When determining the power management profile 128 for a particular application, the power management service 114 may determine the type of application from application metadata 120 in some examples. Alternatively, the electronic device 102 may initially run the application 116 for a threshold time, e.g., 30 seconds to one or two minutes, and may monitor the GPU usage, CPU usage, frame rendering rate, GPS usage, network communications, and so forth. Based on the collected information, the power management service 114 may categorized the application in one of the default power management profiles 128. Subsequently, the next time the application 116 is used, the power management service 114 may automatically apply the selected default power management profile 128 as applicable.

Further, the user 104 may change the default power management profile 128 applied to a particular application 116, may change some of the power management settings of the power management profile 128 for a particular application 116, and so forth. In addition, certain popular applications may have application-specific power management profiles 128 that may be optimized for those particular applications, and which may be applied automatically when those particular applications are executed, such as based on application metadata 120. These designated power management profiles 128 may be updated periodically by the service module 138, such as based on updates to the respective applications, to ensure that the power management profiles 128 remain optimized for the particular application and for the hardware of the particular electronic device 102.

Figure 2:
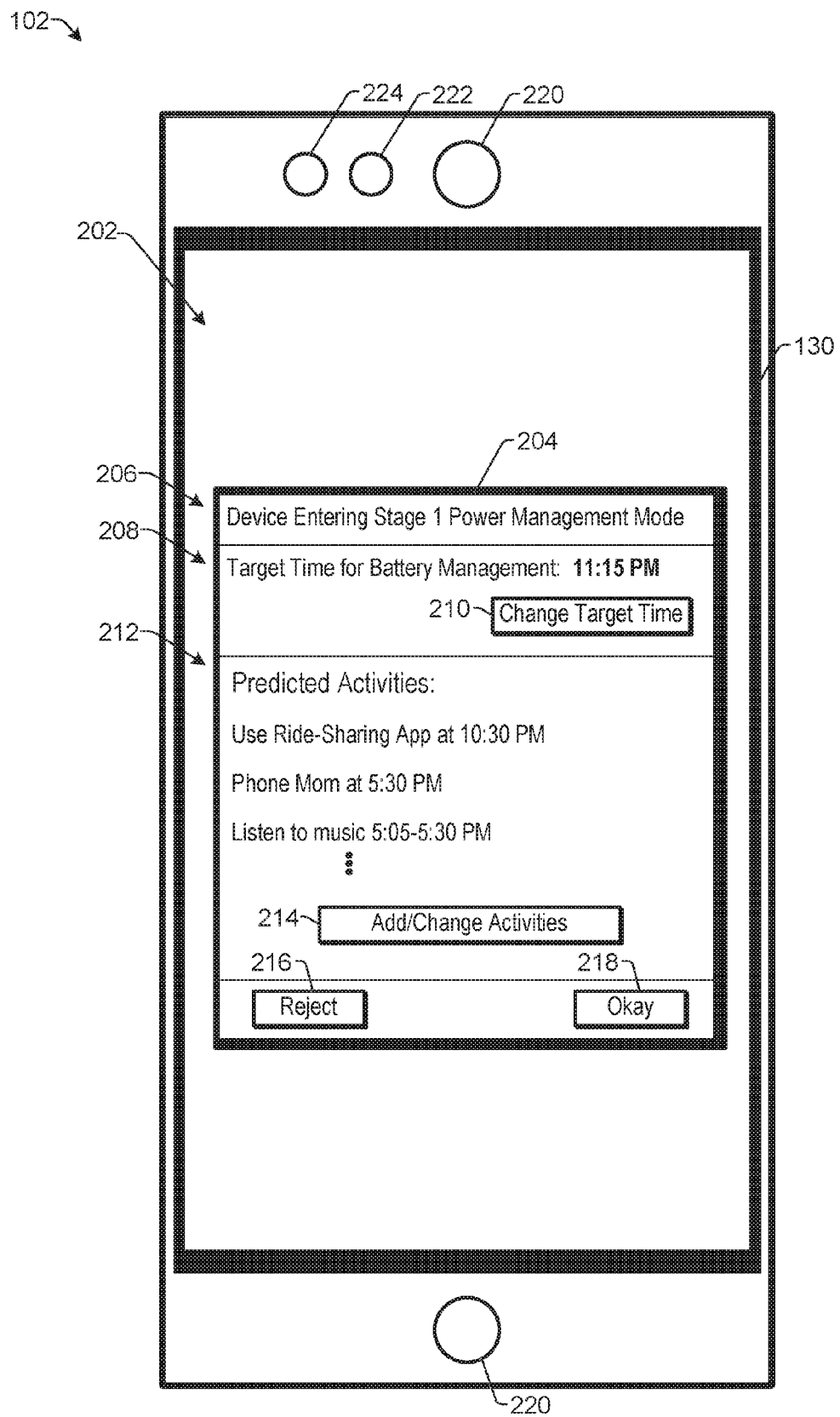
FIG. 2 illustrates an example graphic user interface according to some implementations.

FIG. 2 illustrates an enlarged example view of the electronic device 102 with an example GUI 202 presented on the display 130 according to some implementations. In this example, suppose that the power management service 114 has determined that power management may be used to help extend the battery charge to a target time. Accordingly, the electronic device 102 may present a pop-up window or other GUI 204 including a notification 206 to inform the user that the electronic device 102 is entering one of the stages of power management. For instance, in this example, suppose that the electronic device 102 is entering the stage 1 lower management mode, as discussed above.

Furthermore, in this example, the pop-up window 204 may include the target time 208 for battery management, which in this example is 11:15 PM. In some cases, as discussed above, the power management service may predict the target time automatically based on the usage log information and/or the computational model. Additionally, the GUI 204 may include a button or other virtual control 210, that the user may select to change the predicted target time to a different target time, such as depending on the user's current plan for when the electronic device 102 will next be charged.

In addition, in this example, the pop-up window 204 includes a listing 212 of the predicted user activities that are predicted to take place between a current time and the target time 208. As one example, the user may be able to scroll through the predicted activities 212 to view the activities that the power management service is predicting the user will perform. Furthermore, the GUI 202 may include a button or other virtual control 214 that the user may select to add, delete, or otherwise change the predicted activities 212. For instance, the user may add one or more activities such as from a menu that is presented if the user selects the virtual control 214.

Additionally, if the user does not want to enter the power management mode, the user may select a reject button 216. On the other hand, if the user agrees to enter the power management mode, the user may select an okay button 218. In some implementations, one or more additional GUIs (not shown in FIG. 2) may enable the user to interact with the electronic device 102 for controlling additional power management features on the electronic device 102, such as for setting up particular application profiles, default profiles, or the like. Furthermore, in some examples, the electronic device 102 may include various input/output (I/O) components, such as speakers 220, a camera 222, and a proximity sensor 224.

Figure 3:
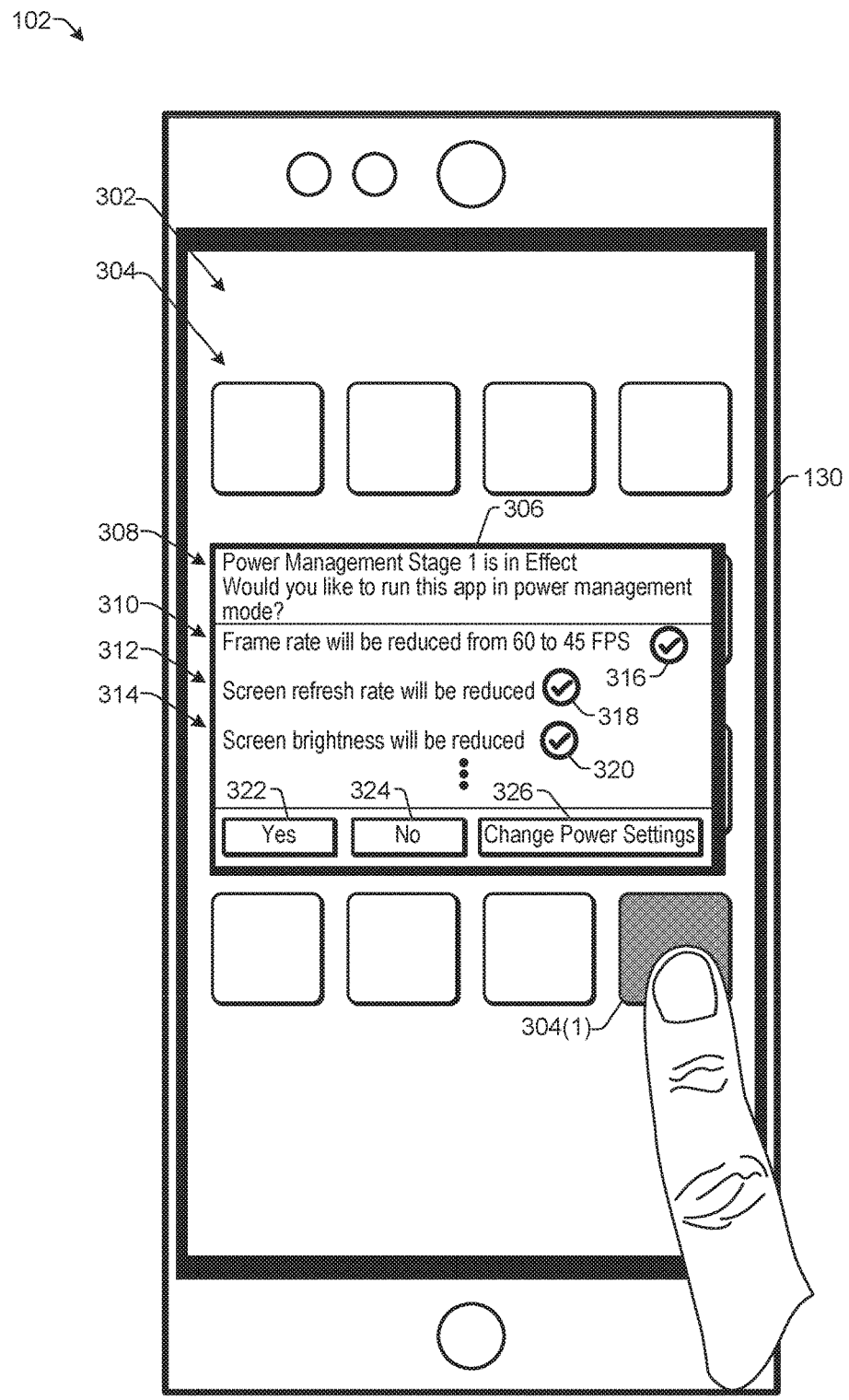
FIG. 3 illustrates an example graphic user interface according to some implementations.

FIG. 3 is an example GUI 302 according to some implementations. In this example, suppose that the GUI 302 includes a plurality of application icons 304. Further, suppose that the user has selected an application icon 304(1) from among the plurality of application icons 304. In response, suppose that the power management service provides a pop-up window 306 indicating that the stage 1 power management mode is in effect, and asking whether the user would like to run the selected application in the power management mode, as indicated at 308. Furthermore, the pop-up window may indicate the details of the power management mode that will be implemented such as based on a corresponding power management profile for the selected application 304(1).

In this example, as indicated at 310, suppose the power management profile for the selected application indicates that the frame rendering rate will be reduced from 60 to 45 FPS; as indicated at 312, the screen refresh rate will be reduced; and as indicated at 314, the screen brightness will be reduced. The user may scroll to view additional power management options that will be implemented.

Furthermore, the user may have the opportunity to deselect one or more of the power management options that will be implemented, such as by tapping on a particular deselection icon 316, 318, and/or 320, respectively. If the user would like to proceed with the power saving mode, the user may select a button or other virtual control 322. If the user would not like to proceed with the power saving mode, the user may select a button or other virtual control 324. If the user would like to change the power settings, the user may select a button or other virtual control 326 to be presented with an additional GUI for managing the power management settings.

FIG. 4 illustrates an example data structure of the usage log 124 according to some implementations. In this example, the usage log 124 includes a time 402 at which the user started using a particular application or feature of the electronic device. Further, the usage log 124 includes an identifier 404 of the application or feature; a duration of use 406; a starting battery level 408, e.g., in percent; an ending battery level 410; a geolocation 412 at which the activity was performed; a power management mode 414 that was in effect when the activity was performed; and a power management profile 416 that was applied during the usage of the application or feature.

In this example, two example entries in the usage log 124 are illustrated; although, typically there may be a large number of entries. For instance, an entry may be made every time the user, accesses the electronic device, opens an application, and/or uses a feature of the electronic device. A first example entry 418 indicates that the user used a social media application on the electronic device for 15 minutes and 11 seconds while the electronic device was in the stage 1 power management mode and while the electronic device was restricting some computing resources of the electronic device by applying an application-specific profile for the application. Further, during the usage of the social media application, the battery level fell from 77 percent to 75 percent. Next, as indicated by a second example entry 420, the user made a telephone call that lasted 1 minute and 46 seconds. During the call, the battery level fell from 75 percent to 74 percent, and the power management profile applied during the call was the default power management profile for the telephone feature.

Through the usage log, the amount of battery charge used by various applications and features in various power management modes may be determined and may be used for predicting how much battery charge might be needed for activities that are predicted to be performed later in the day until the target time is reached. Further, while several selected metrics are illustrated as being recorded in the usage log 124 in this example, fewer, more, or different metrics may be recorded in the usage log 124 in other examples.

Figure 5:
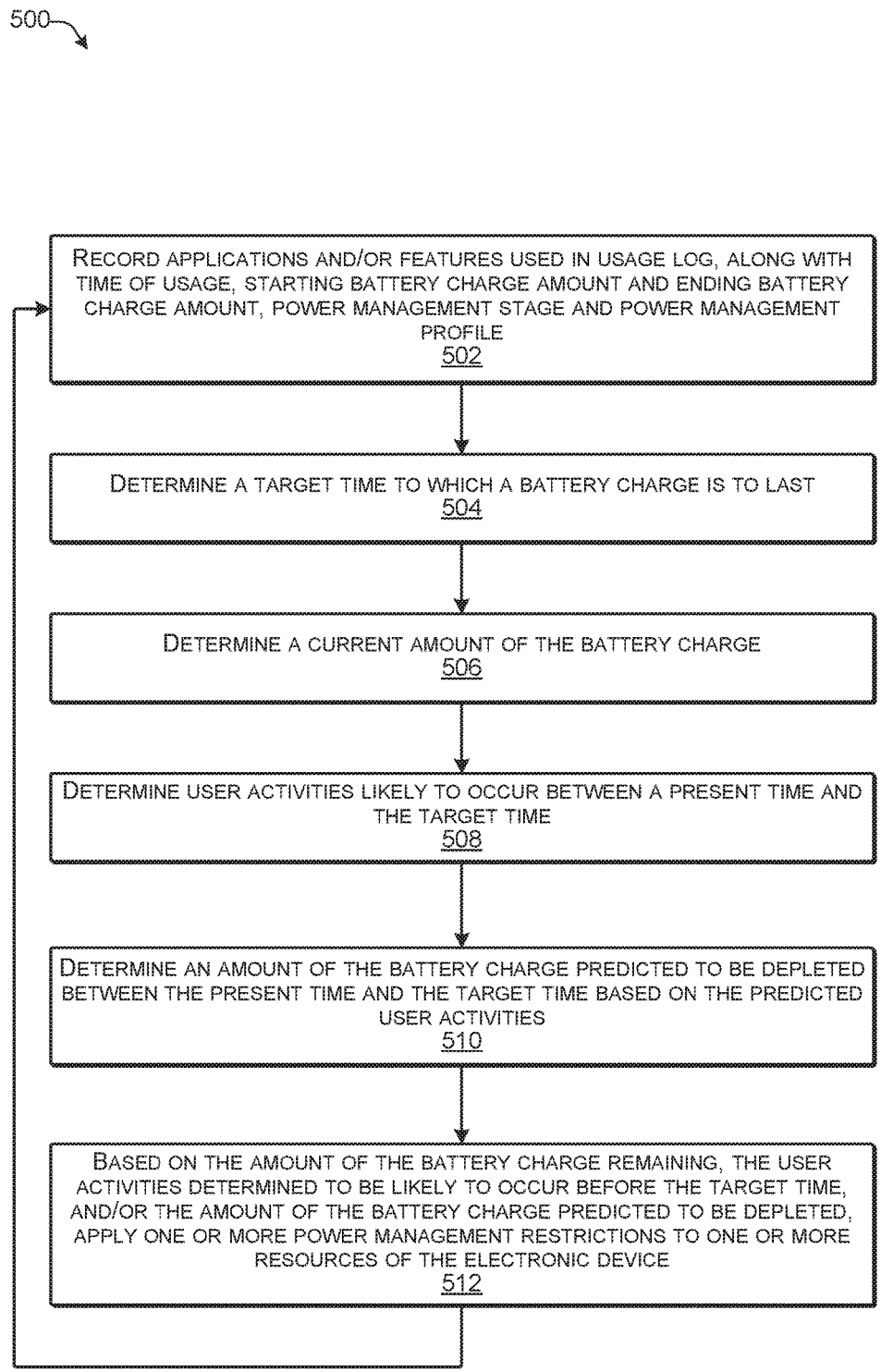
FIG. 5 is a flow diagram illustrating an example process for power management on an electronic device according to some implementations.

FIG. 5 is a flow diagram illustrating an example process according to some implementations. The process is illustrated as a collection of blocks in logical a flow diagram, which represents a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, architectures, devices, and systems described in the examples herein, although the process may be implemented in a wide variety of other environments, architectures, devices, and systems.

FIG. 5 illustrates an example process 500 for power management according to some implementations. In some examples, the process 500 may be executed by the electronic device 102 or by another suitable computing device.

At 502, the electronic device may record applications and/or features used in usage log, along with time of usage, starting battery charge amount and ending battery charge amount, power management stage and power management profile in effect at the time, a geographic location of the usage, a duration of the usage, and the like. In some examples, the electronic device may send, to a computing device over a network, at least a portion of information included in the usage log, and in response, may receive, from the computing device, a computational model generated based at least partially on the portion of information sent over the network. For instance, the computational model may be used for determining various information, such as a target time, user activities predicted to occur before the target time, and/or a recommended power management stage.

At 504, the electronic device may determine a target time to which a battery charge is to last, such as until the next time the battery is expected to be charged. As one example, the user may manually enter the target time. Alternatively, the electronic device may determine the target time based on historical usage data obtained from the usage log and/or by applying one or more inputs to a computational model. For instance, the target time may be predicted by the electronic device based on a current location and recent locations of the electronic device (e.g., geolocations already visited that day), and further based on the time at which the electronic device has usually been charged in the past when the electronic device has been at those locations, such as on a same day of the week, such as when the electronic device has been used to perform similar activities, and so forth.

At 506, the electronic device may determine a current amount of the battery charge remaining, such as a percentage or other amount of battery charge remaining. As one example, the OS may have a module for accessing a power controller associated with the battery that may determine the amount of battery charge currently held by the battery such as a percentage of total charge, a charge level in milliamp hours (mAh), or the like.

At 508, the electronic device may determine one or more user activities likely to occur between a present time and the target time. For example, based at least partially on the historical usage data in the usage log, the electronic device may determine one or more user activities that the user is likely to perform during the current day from the current time until the target time. For example, based at least partially on current and recent geolocations and/or for a particular day of the week, the electronic device may determine the applications and features on the electronic device that are likely to be used between the present time and the target time. These applications and features predicted to be used may be listed as predicted user activities. In some examples, the predicted user activities may be determined by using a computational model trained, at least in part, using the historic usage log information.

At 510, the electronic device may determine how much of the battery charge is predicted to be depleted between the current time and the target time based on the predicted user activities. For example, the electronic device may maintain in the usage log the amount of battery charge used by each activity in the past. Further, in some cases the usage log may indicate how much batter charge is used by each activity in different power management modes, such as under normal mode, stage 1 power management mode, stage 2 power management mode, and/or stage 3 power management mode. Accordingly, based on the history of battery charge depletion included in the usage log information, the electronic device is able to determine which power management stage to employ for the user activities that are currently predicted to take place before the target time is reached.

At 512, based on the amount of the battery charge remaining, the determined user activities likely to occur before the target time, and/or the amount of the battery charge predicted to be depleted, the electronic device may apply one or more power management restrictions to one or more resources of the electronic device. As one example, the power management restrictions may include restricting a number of frames per second rendered for presentation on the display and/or restricting a refresh rate of the display. Numerous other examples of power management restrictions are discussed above. Additionally, the one or more power management restrictions may be applied according to a plurality of stages, e.g., a first stage may include less restrictive power management restrictions and a second stage may include more restrictive power management restrictions, and so forth. One of the stages may be selected based at least partially on the determined user activities likely to occur before the target time.

In addition, a plurality of application-specific power management profiles and/or default application category power management profiles may be stored in the computer-readable media. Each application-specific power management profile may indicate the one or more power management restrictions to apply to the one or more resources for an individual application of a plurality of applications installed on the electronic device. Further, each application category power management profile may indicate the one or more power management restrictions to apply to the one or more resources for a category of application installed on the electronic device.

Furthermore, as additional applications and/or features of the electronic device are used by the user, the electronic device may repeat the process of blocks 502-512 so that the power management settings of the electronic device may be continually updated based on the latest usage information and the current battery charge amount remaining.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
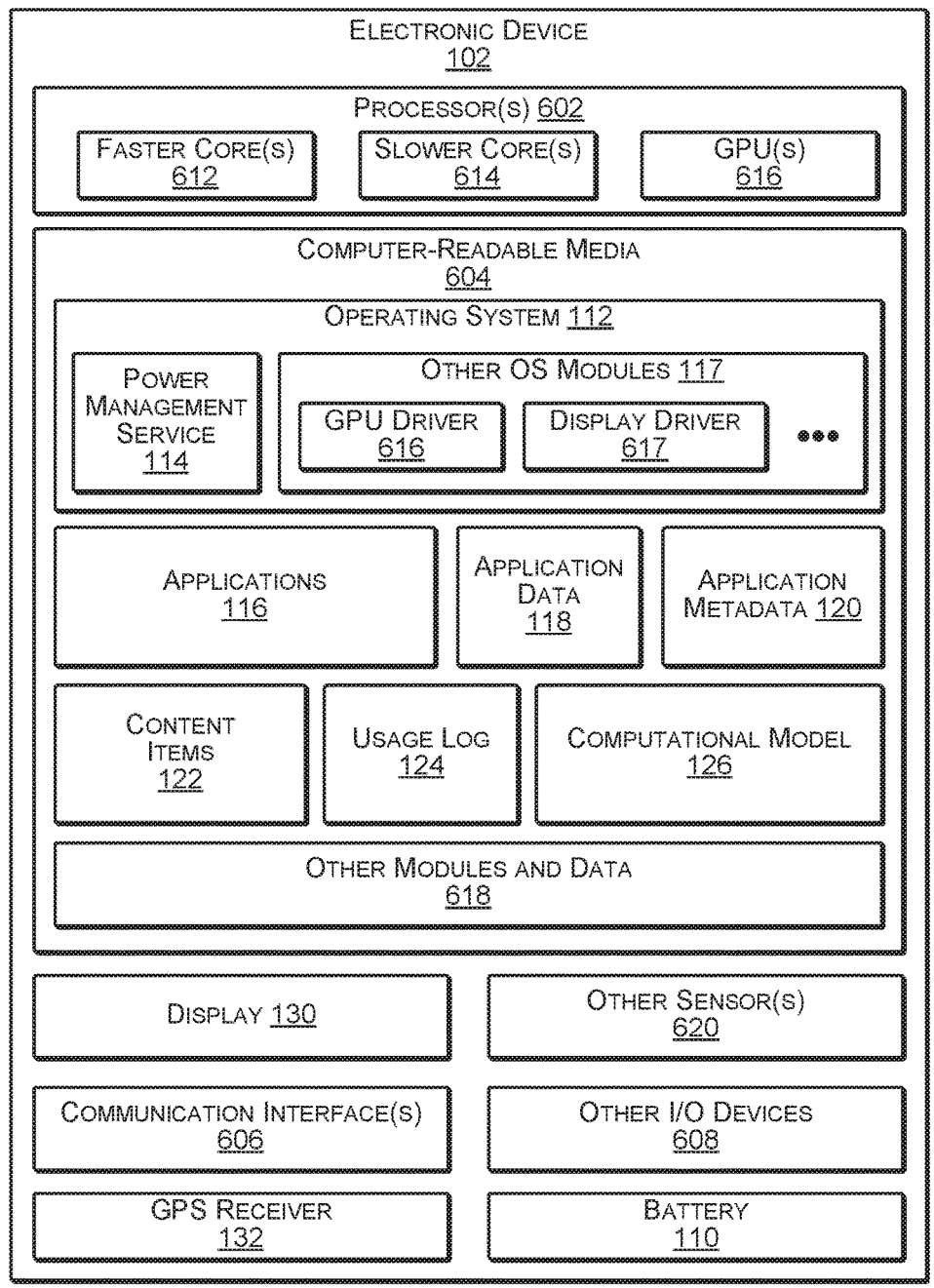
FIG. 6 illustrates select components of an example electronic device according to some implementations.

FIG. 6 illustrates select example components of the electronic device 102 that may implement the functionality described above according to some examples.

The electronic device 102 may be any of a number of different types of computing devices, as enumerated above. In the example of FIG. 6, the electronic device 102 includes a plurality of components, such as at least one processor 602, one or more computer-readable media 604, one or more communication interfaces 606, and one or more input/output (I/O) devices 608.

Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some cases, the processor 602 may be one or more hardware processors and/or logic circuits of any suitable type specifically programmed or configured to execute the algorithms and processes described herein. The processor 602 can be configured to fetch and execute computer-readable processor-executable instructions stored in the computer-readable media 604. In this example, the processor includes one or more faster cores 612 and one or more slower cores 614. For instance, in some examples, the processors 602 may include one or more CPUs with a BIG.LITTLE® architecture or other heterogeneous computing architecture that includes a mix of faster cores 612 and slower cores 614. For instance, a CPU may include four faster cores 612 and four slower cores 614. Further, in some examples, the maximum frequency of the cores may be throttled, or otherwise limited to limit the power consumption of the processors. In addition, the processors 602 may include one or more graphic processing units (GPUs) 616, which may also be controlled, such as for controlling a frame rendering rate and/or for controlling an operating frequency.

Depending on the configuration of the electronic device 102, the computer-readable media 604 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 604 may include, but is not limited to, RAM, ROM, EEPROM, flash memory, solid-state storage, magnetic disk storage, optical storage, and/or other computer-readable media technology. Further, in some cases, the electronic device 102 may access external storage, such as RAID storage systems, storage arrays, network attached storage, storage area networks, cloud storage, or any other medium that can be used to store information and that can be accessed by the processor 602 directly or through another computing device or network. Accordingly, the computer-readable media 604 may be computer storage media able to store instructions, modules, or components that may be executed by the processor 602. Further, when mentioned, non-transitory computer-readable media exclude media such as energy, carrier signals, electromagnetic waves, and signals per se.

The computer-readable media 604 may be used to store and maintain any number of functional components that are executable by the processor 602. In some implementations, these functional components comprise instructions or programs that are executable by the processor 602 and that, when executed, implement operational logic for performing the actions attributed above to the electronic device 102.

Functional components of the electronic device 102 stored in the computer-readable media 604 may include the power management service 114 and the applications 116. In some examples, the power management service 114 may be one or more executable modules of the operating system 112, while in other examples, some or all of the modules of the power management service 114 may be separate from the operating system 112. Additional functional components may include the other OS modules 117 of the operating system 112 for controlling and managing various functions of the electronic device 102 and for enabling basic user interactions with the electronic device 102. For instance, the other OS modules 117 may include a GPU driver 615 and a display driver 617 that are controlled in some examples herein for limiting the frame rendering rate and the display refresh rate and/or display brightness, respectively.

The computer-readable media 604 may store the application data 118, application metadata 120, content items 122, the usage log 124, and the computational model 126. In addition, depending on the type of the electronic device 102, the computer-readable media 604 may also store other functional components and data, such as other modules and data 618, which may include applications, programs, drivers, etc., and other data used or generated by the functional components. Further, the electronic device 102 may include many other logical, programmatic, and physical components, of which those described are merely examples that are related to the discussion herein.

The communication interface(s) 606 may include one or more interfaces and hardware components for enabling communication with various other devices, such as over the network(s) 106 or directly. For example, communication interface(s) 606 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 6 further illustrates that the electronic device 102 may include the display 130. Depending on the type of computing device used as the electronic device 102, the display 130 may employ any suitable display technology able to present digital content thereon. In some examples, the display 130 may have a touch sensor (not shown) associated with the display 130 to provide a touchscreen display configured to receive touch inputs for enabling interaction with a UI presented on the display 130. Accordingly, implementations herein are not limited to any particular display technology.

The electronic device 102 may further include the GPS receiver 132 and one or more other sensors 620, such as an accelerometer, gyroscope, compass, the proximity sensor, and the like. The electronic device 102 may further include one or more other I/O devices 608. The I/O devices 608 may include the speakers, a microphone, one or more cameras, and various user controls (e.g., buttons, a joystick, a keyboard, a keypad, etc.), a haptic output device, and so forth. Additionally, the electronic device 102 may include the battery 110 and various other components that are not shown, examples of which may include removable storage, a power control unit, and so forth.

Figure 7:
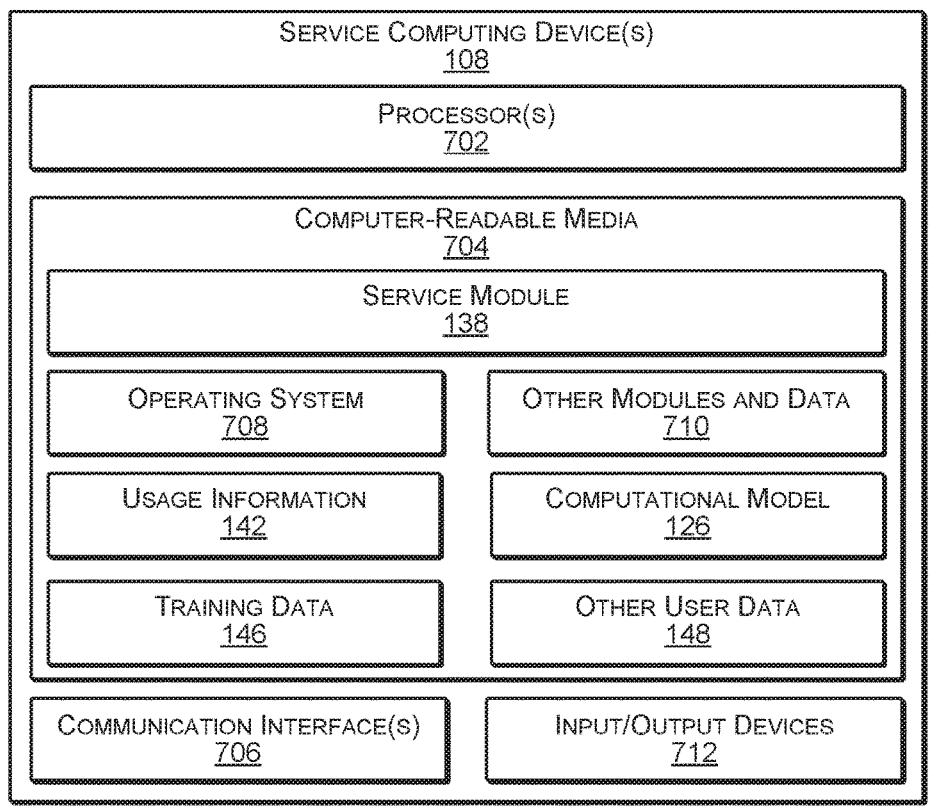
FIG. 7 illustrates select components of one or more example service computing devices according to some implementations.

FIG. 7 illustrates select components of the one or more service computing device(s) 108 that may be used to implement some functionality of the power management service described herein. In some examples, the service computing device 108 may be operated by a service provider that provides the network storage service, and may include one or more servers or other types of computing devices that may be embodied in any number of ways. For instance, in the case of a server, the modules, other functional components, and data storage (e.g., storage devices 140) may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 108 as being present in a single location, these components and data may alternatively be distributed across different computing devices and different locations in any manner Consequently, the functions may be implemented by one or more service computing devices, with the various functionality described above distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different buyers or enterprises.

In the illustrated example, each service computing device 108 may include, or may have associated therewith, one or more processors 702, one or more computer-readable media 704, and one or more communication interfaces 706. Each processor 702 may be a single processing unit or a number of processing units, and may include single or multiple computing units, or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 may include the storage devices 140 discussed above with respect to FIG. 1 (not shown in FIG. 7). In some cases, the storage devices 140 may be at the same location as the service computing device(s) 108, while in other examples, the storage devices 140 may be remote from the service computing device(s) 108. The computer-readable media 704 may further include volatile and nonvolatile memory and/or removable and non-removable media implemented in any type of technology for storage of information, such as computer-readable instructions, data structures, program modules, or other data. Such computer-readable media 704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 108, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 may be used to store any number of functional components that are executable by the processors 702. In many implementations, these functional components comprise instructions or programs that are executable by the processors 702 and that, when executed, specifically configure the one or more processors 702 to perform the actions attributed above to the service computing device 108. Functional components stored in the computer-readable media 704 may include the service module 138. Additional functional components stored in the computer-readable media 704 may include an operating system 708 for controlling and managing various functions of the service computing device 108.

In addition, the computer-readable media 704 may store data used for performing the functions and services described herein. Thus, the computer-readable media 704 may store the usage information 142, the computational model 126, the training data 146, and the other user data 148. The service computing device 108 may also include or maintain other functional components and data, such as other modules and data 710, which may include programs, drivers, etc., and the data used or generated by the functional components. Further, the service computing device 108 may include many other logical, programmatic, and physical components, of which those described above are merely examples that are related to the discussion herein.

The communication interface(s) 706 may include one or more interfaces and hardware components for enabling communication with various other devices, such as over the network(s) 106. For example, communication interface(s) 706 may enable communication through one or more of the Internet, cable networks, cellular networks, wireless networks (e.g., Wi-Fi) and wired networks, as well as short-range communications such as BLUETOOTH®, and the like, as additionally enumerated elsewhere herein.

The service computing device 108 may further be equipped with various input/output (I/O) devices 712. Such I/O devices 712 may include a display, various user interface controls (e.g., buttons, joystick, keyboard, mouse, touch screen, etc.), audio speakers, connection ports and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. An electronic device comprising:
   one or more processors;
   a display coupled to the one or more processors; and one or more computer-readable media storing instructions executable by the one or more processors, for programming the one or more processors to:
    determine a target time to which a battery charge is to last;
    determine, at a first time instance, a first current amount of the battery charge;
    determine a first set of user activities likely to occur between the first time instance and the target time;
    determine a first amount of the battery charge predicted to be depleted between the first time instance and the target time based on the determined first set of user activities;
    based at least partially on the first amount of the battery charge predicted to be depleted, apply a first set of power management restrictions to a first set of resources of the electronic device for a first category of applications, and apply a second set of power management restrictions to a second set of resources of the electronic device for a second category of applications;
    determine, at a second time instance subsequent to the first time instance, a second current amount of the battery charge;
    determine a second set of user activities likely to occur between the second time instance and the target time;
    determine a second amount of the battery charge predicted to be depleted between the second time instance and the target time based on the determined second set of user activities; and
    based at least partially on the second amount of the battery charge predicted to be depleted, apply a third set of power management restrictions to the first set of resources of the electronic device for the first category of applications, and apply a fourth set of power management restrictions to the second set of resources of the electronic device for the second category of applications,
    wherein the third set of power management restrictions is less restrictive than the first set of power management restrictions, and the fourth set of power management restrictions is less restrictive than the second set of power management restrictions.

2. The electronic device as recited in claim 1, wherein the first set of power management restrictions include at least one of:
    restricting a number of frames per second rendered for presentation on the display; or
    restricting a refresh rate of the display.

3. The electronic device as recited in claim 1, wherein:
    power management restrictions are applied according to a plurality of stages, wherein a first stage includes the third and fourth sets of power management restrictions and a second stage includes the first and second sets of power management restrictions; and
    one of the first stage or the second stage is selected based at least partially on an amount of the battery charge remaining and user activities determined to be likely to occur before the target time.

4. The electronic device as recited in claim 1, further comprising at least one of: a plurality of application-specific power management profiles stored in the computer-readable media, each application-specific power management profile indicating one or more power management restrictions to apply to one or more resources for an individual application of a plurality of applications installed on the electronic device; or
    a plurality of application category power management profiles stored in the computer-readable media, each application category power management profile indicating one or more power management restrictions to apply to one or more resources for a category of application installed on the electronic device.

5. The electronic device as recited in claim 1, wherein the one or more processors are further programmed to determine the first set of user activities likely to occur between the first time instance and the target time based at least partially on a usage log stored in the one or more computer-readable media, wherein the usage log includes at least one of:
    an identifier of a respective application or feature used;
    a time and day of usage the respective application or feature;
    a geographic location of the usage;
    a change in battery charge amount determined based on the usage; or
    a power management mode in effect during the usage.

6. The electronic device as recited in claim 5, wherein the one or more processors are further programmed to:
    send, to a computing device over a network, at least a portion of information included in the usage log; and
    receive, from the computing device, a computational model generated based at least partially on the portion of information sent over the network.

7. The electronic device as recited in claim 6, wherein the one or more processors are further programmed to determine at least one of the target time or the first set of user activities based at least partially on at least one of: the usage log; the computational model; or a received user input.

8. A method comprising:
    determining, by a processor of an electronic device, a target time to which a battery charge is to last;
    determining, at a first time instance, a first amount of the battery charge remaining;
    determining a first set of user activities likely to occur between the first time instance and the target time;
    based at least partially on the first amount of the battery charge remaining and the first set of user activities determined to be likely to occur before the target time, applying a first set of power management restrictions to a first set of resources of the electronic device for a first category of applications, and apply a second set of power management restrictions to a second set of resources of the electronic device for a second category of applications;
    determining, at a second time instance subsequent to the first time instance, a second amount of the battery charge remaining;
    determining a second set of user activities likely to occur between the second time instance and the target time; and
    based at least partially on the second amount of the battery charge remaining and the second set of user activities determined to be likely to occur before the target time, applying a third set of power management restrictions to the first set of resources of the electronic device for the first category of applications, and applying a fourth set of power management restrictions to the second set of resources of the electronic device for the second category of applications,
    wherein the third set of power management restrictions is less restrictive than the first set of power management restrictions, and the fourth set of power management restrictions is less restrictive than the second set of power management restrictions.

9. The method as recited in claim 8, wherein applying the first set of power management restrictions further comprises at least one of:
   restricting a number of frames per second rendered for presentation on a display associated with the electronic device; or
   restricting a refresh rate of the display.

10. The method as recited in claim 8, further comprising:
    applying power management restrictions according to one of a plurality of stages, wherein a first stage includes the third and fourth sets of power management restrictions and a second stage includes the first and second sets of power management restrictions; and
    selecting one of the first stage or the second stage based at least partially on an amount of the battery charge remaining and user activities determined to be likely to occur before the target time.

11. The method as recited in claim 8, further comprising applying the first set of power management restrictions according to at least one of an application-specific power management profile or an application category power management profile, the application-specific power management profile indicating one or more power management restrictions to apply to one or more resources for an individual application of a plurality of applications installed on the electronic device, and the application category power management profile indicating one or more power management restrictions to apply to one or more resources for a category of application installed on the electronic device.

12. The method as recited in claim 8, further comprising storing, in a usage log, a record of an application and/or feature used on the electronic device, wherein the usage log includes at least one of:
    an identifier of a respective application or feature used;
    a time and day of usage the respective application or feature;
    a geographic location of the usage;
    a change in battery charge amount determined based on the usage; or
    a power management mode in effect during the usage.

13. The method as recited in claim 12, further comprising:
    sending, to a computing device over a network, at least a portion of information included in the usage log; and
    receiving, from the computing device, a computational model generated based at least partially on the portion of information sent over the network.

14. The method as recited in claim 13, further comprising determining at least one of the target time or the first set of user activities based at least partially on at least one of: the usage log; the computational model; or a received user input.

15. One or more non-transitory computer-readable media maintaining instructions that, when executed by one or more processors of an electronic device, program the one or more processors to:
    determine a target time to which a battery charge is to last;
    determine, at a first time instance, a first amount of the battery charge remaining;
    determine a first set of user activities likely to occur between the first time instance and the target time;
    based at least partially on the first amount of the battery charge remaining and the first set of user activities determined to be likely to occur before the target time, apply a first set of power management restrictions to a first set of resources of the electronic device for a first category of applications, and apply a second set of power management restrictions to a second set of resources of the electronic device for a second category of applications;
    determine, at a second time instance subsequent to the first time instance, a second amount of the battery charge remaining;
    determine a second set of user activities likely to occur between the second time instance and the target time; and
    based at least partially on the second amount of the battery charge remaining and the second set of user activities determined to be likely to occur before the target time, apply a third set of power management restrictions to the first set of resources of the electronic device for the first category of applications, and apply a fourth set of power management restrictions to the second set of resources of the electronic device for the second category of applications,
    wherein the third set of power management restrictions is less restrictive than the first set of power management restrictions, and the fourth set of power management restrictions is less restrictive than the second set of power management restrictions.

16. The one or more non-transitory computer-readable media as recited in claim 15, wherein the one or more processors are further programmed to:
    determine a first amount of the battery charge predicted to be depleted between the first time instance and the target time based on the first set of user activities; and
    determine the first and second sets of power management restrictions to apply based at least partially on the first amount of the battery charge predicted to be depleted before the target time.

17. The one or more non-transitory computer-readable media as recited in claim 15, wherein the one or more processors are further programmed to apply the first set of power management restrictions by at least one of:
    restricting a number of frames per second rendered for presentation on a display associated with the electronic device; or
    restricting a refresh rate of the display.

18. The one or more non-transitory computer-readable media as recited in claim 15, wherein the one or more processors are further programmed to:
    apply power management restrictions according to one of a plurality of stages, wherein a first stage includes the third and fourth sets of power management restrictions and a second stage includes the first and second sets of power management restrictions; and
    apply the first set of power management restrictions according to at least one of an application-specific power management profile or an application category power management profile, the application-specific power management profile indicating one or more power management restrictions to apply to one or more resources for an individual application of a plurality of applications installed on the electronic device, and the application category power management profile indicating one or more power management restrictions to apply to one or more resources for a category of application installed on the electronic device.

19. The one or more non-transitory computer-readable media as recited in claim 15, wherein the one or more processors are further programmed to store, in a usage log, a record of an application and/or feature used on the electronic device, wherein the usage log includes at least one of:
    an identifier of a respective application or feature used;

a time and day of usage the respective application or feature;

a geographic location of the usage;

a change in battery charge amount determined based on the usage; or a power management mode in effect during the usage.

20. The one or more non-transitory computer-readable media as recited in claim 19, wherein the one or more processors are further programmed to:

send, to a computing device over a network, at least a portion of information included in the usage log;

receive, from the computing device, a computational model generated based at least partially on the portion of information sent over the network; and determine at least one of the target time or the first set of user activities based at least partially on the computational model.

* * * * *